United States Patent [19]
Odaka

[11] Patent Number: 4,544,958
[45] Date of Patent: Oct. 1, 1985

[54] HIGH-SPEED RECORDING AND REPRODUCING OF SIGNALS

[75] Inventor: Kentaro Odaka, Kawasaki, Japan

[73] Assignee: Sony Corporation, Tokyo, Japan

[21] Appl. No.: 564,890

[22] Filed: Dec. 23, 1983

[30] Foreign Application Priority Data

Dec. 27, 1982 [JP] Japan ................................. 57-230599

[51] Int. Cl.$^4$ ................................................ G11B 5/00
[52] U.S. Cl. ............................................ 360/8; 360/32
[58] Field of Search ................................. 360/8, 32, 10

[56] References Cited

U.S. PATENT DOCUMENTS

| | | | |
|---|---|---|---|
| 4,206,476 | 6/1980 | Hashimoto | 360/8 |
| 4,413,289 | 11/1983 | Weaver et al. | 360/8 |
| 4,458,272 | 7/1984 | Heitmann | 360/8 |

FOREIGN PATENT DOCUMENTS 2939962  5/1980  Fed. Rep. of Germany .......... 360/8

*Primary Examiner*—Vincent P. Canney
*Attorney, Agent, or Firm*—Lewis H. Eslinger; Alvin Sinderbrand

[57] ABSTRACT

Apparatus for recording an analog signal employs n rotary heads (where n is a positive integer) which cooperate with a magnetic tape wound around a tape guide drum over an angular range of $\alpha°$ (where $\alpha°$ is less than or equal to 360°) and the rotary magnetic heads are rotated at a speed N (where N is greater than one) times a reference rotation speed. The input analog signal to be recorded is first converted to a pulse-code-modulated (PCM) data signal which is then time-base compressed by a ratio of $(n \times \alpha°)/(N \times 360°)$ at successive predetermined periods. The PCM data that has been compressed in time base is recorded on the magnetic tape by the n rotary heads during predetermined intervals that occur within the time when the n rotary heads are in contact with the magnetic tape. The time-base compression of the data permits the addition of error correction codes and parity words to provide error detection and correction during reproduction of the recorded digital signals and by raising the rotary head speed the number of memory units required to perform the time-base compression is minimized.

17 Claims, 35 Drawing Figures

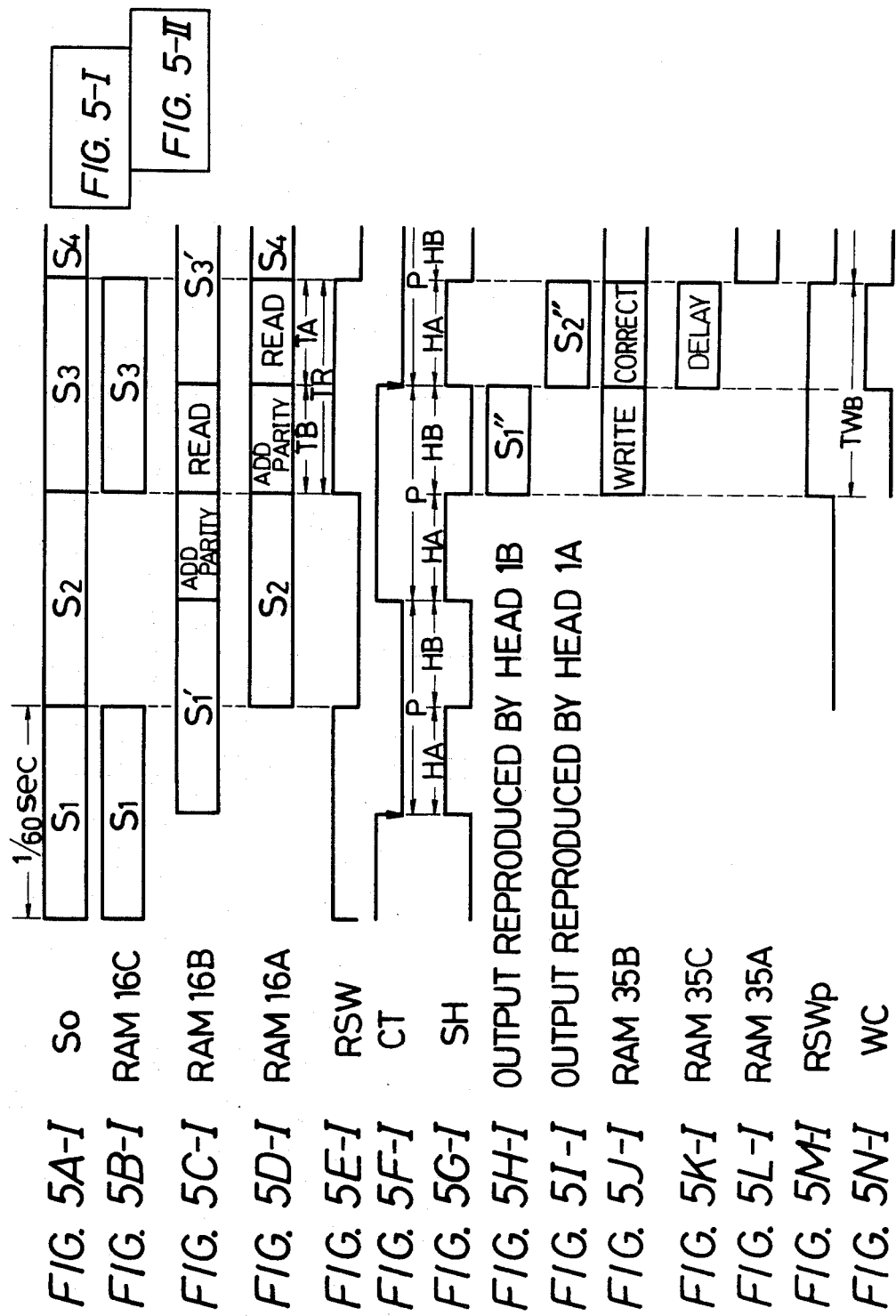

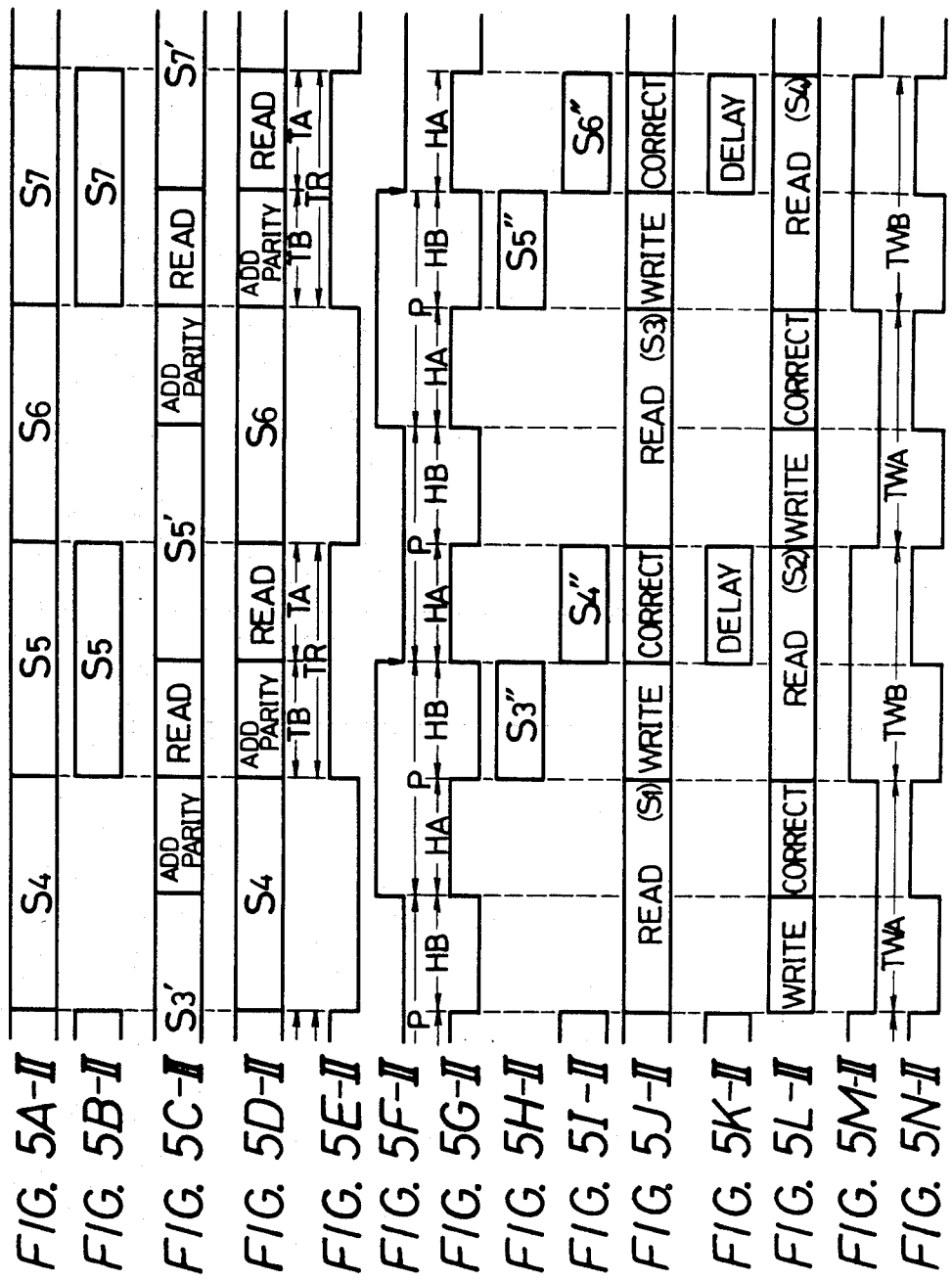

HIGH-SPEED RECORDING AND REPRODUCING OF SIGNALS

BACKGROUND OF THE INVENTION

1. Field of the Invention

This invention relates generally to a method and apparatus for recording and/or reproducing an analog signal and, more particularly, to a method and apparatus for recording and/or reproducing an analog signal as a pulse-code-modulated (PCM) signal incorporating error-correcting and parity information in which the time-base is compressed prior to recording and is expanded upon reproduction.

2. Description of the Prior Art

Recording and reproducing an analog signal, such as an audio signal, as a pulse-code-modulated (PCM) signal permits high-quality recording and reproduction. Both fixed-head and rotating-head systems have been used for recording and/or reproducing PCM signals, and the rotary head system of a video tape recorder (VTR) has been proposed to record an audio PCM signal. Typically, in a VTR having two rotary heads, the heads are located diametrically opposite on a rotating drum, that is, the heads are spaced 180° apart and the magnetic tape is wrapped about the periphery of a tape-guide drum for an angular extent substantially the same as the head separation. Each head then traces or scans a track on the tape for each revolution of the drum. When the information signal is recorded by the rotary head on the tape in the form of an analog signal, in order to prevent signal dropouts, it is necessary that the rotary head recording the signal always be in contact with the tape. Otherwise, the signal would not be continuously recorded. On the other hand, in the case of recording a PCM information signal, because the PCM signal is a digital signal the time-base thereof can be compressed and/or expanded in a straightforward fashion by the use of one or more digital memory units. An example of apparatus for recording and/or reproducing a PCM signal using a rotary head system is disclosed in U.S. patent application Ser. No. 06/485,065, filed Apr. 14, 1983 and assigned to the same assignee herein. In that application it is recognized that when the PCM signal is recorded by the rotary head with no dropouts in a fashion similar to an analog signal there is no time available in which to add redundant data, such as parity words or error check words, to the PCM signal. Accordingly, apparatus is disclosed that employs a system of buffer memories, random access memories, and appropriate switching networks to delay the signals to be recorded. This processing of the PCM signal to be recorded, while effective, is complex and cumbersome, as well as costly since it involves so many additional circuit elements. Nevertheless, time-base compression is necessary in order to provide the additional time within which to perform error detection and correction.

Along with all of these problems there is the further requirement that the rotary head and tape-guide drum subassembly be as small as possible, in order to promote the portability of the unit. A principal limiting factor on the minimum dimensions of a video tape recorder is the diameter of the tape-guide drum.

OBJECTS AND SUMMARY OF THE INVENTION

Accordingly, it is an object of the present invention to provide a method and apparatus for recording and/or reproducing an analog signal, which can overcome the above-noted defects inherent in the prior art.

Another object of this invention is to provide an improved method and apparatus for recording an analog signal converted into PCM data and then recorded on a recording medium by a rotary head, and an improved method and apparatus for reproducing such PCM data.

Another object of this invention is to provide apparatus that can record PCM data on a recording medium with a time-base compressed by a predetermined compression ratio by causing the rotation speed of the rotary head to be N times a reference rotation speed, where N is greater than 1, and by selecting a tape wrap angle $\alpha°$ in response to the number of heads and the mutual mounting angular distance, where $\alpha°$ is less than or equal to 360°.

A further object of this invention is to provide apparatus for recording a PCM data signal using a rotary head, wherein during the time period when the PCM signal is not recorded on the record medium time-base compression of the PCM data and the addition of the error-correction code thereto can be carried out by using a minimum number of memory units.

In accordance with an aspect of the present invention, when recording an analog signal on a magnetic medium using a number n rotary heads, where n is a positive integer, the analog signal is converted to a digital signal and the recording medium is wrapped around a tape-guide drum for contact with the heads over an angular range of $\alpha°$, where $\alpha°$ is less than 360° and the N heads are rotated at a speed N times a reference head rotation speed, where N is greater than 1, and the time-base of the digital signal is compressed by a compression ratio given by $n \times \alpha°/(N \times 360°)$ at every predetermined period, thereby to generate a recording signal that is selectively supplied to the heads. In reproducing a signal thus recorded, the medium is again scanned by the heads during a scanning period that includes at least two free time periods within which the compressed signals can be expanded and parity and error-correction code data can be used to correct the reproduced PCM signal which is then time-base expanded and converted into an analog signal. The above, and other objects, features, and advantages of the present invention, will become apparent from the following detailed description of illustrative embodiments thereof to be read in conjunction with the accompanying drawings, in which like references designate the same elements and parts.

BRIEF DESCRIPTION OF THE DRAWINGS

FIGS. 5A-I through 5N-II are timing charts and waveforms representing the recording and/or reproducing operation of the apparatus according to the present invention;

DETAILED DESCRIPTION OF PREFERRED EMBODIMENTS

Figure 1:
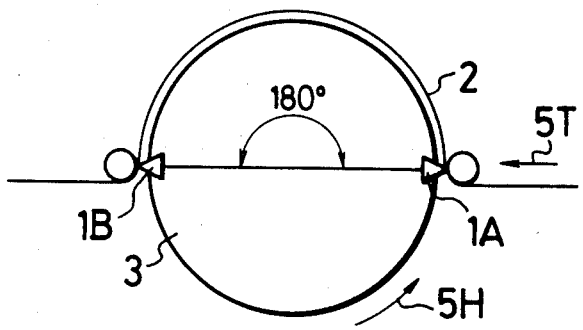
FIG. 1 is a schematic representation of a rotary head assembly used in the method and apparatus for recording and/or reproducing an analog signal according to the present invention.

FIG. 1 schematically illustrates a rotary head assembly, as used in the present invention, that includes two magnetic heads 1A and 1B mounted on a rotating drum (not shown). In this embodiment, the two rotary magnetic heads 1A and 1B are separated by an angular distance of 360°/2=180°, that is, they are diametrically opposed, and the magnetic tape 2 on which the signals are to be recorded and/or reproduced is wrapped around the peripheral surface of a tape-guide drum 3 over an angular extent of 180°.

In the U.S. patent application identified above and assigned to the assignee hereof, a recording apparatus is disclosed in which the magnetic tape is wound around the peripheral surface of the tape-guide drum for an angular extent of 90° and the rotational speed at which the rotary head is turned is 30 revolutions per second. This rotary head speed can be taken as a reference rotation speed, and in this embodiment of the present invention rotary heads 1A and 1B are rotated at a speed that is twice this reference rotational speed, that is, the heads are rotated at 60 revolutions per second.

Figure 2:
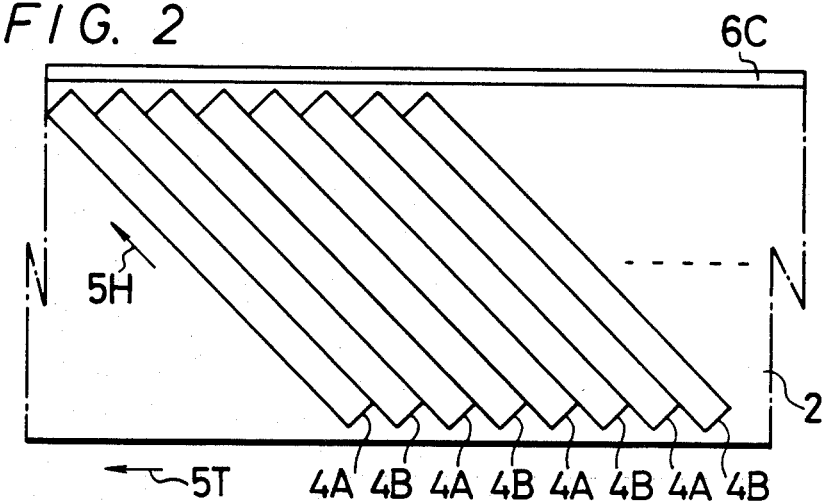
FIG. 2 is a illustration of the orientation of tracks recorded on a magnetic tape using the rotary head assembly shown in FIG. 1.

In this embodiment, when tape 2 is transported at a predetermined speed in a direction shown generally by arrow 5T the rotary heads 1A and 1B will trace thereon a plurality of magnetic tracks 4A and 4B, respectively, as represented in FIG. 2. These slanted magnetic tracks are recorded one by one on the magnetic tape 2 by the rotary heads 1A and 1B thereby recording the signal in a fashion that will be described hereinbelow. In this embodiment, high-density data recording is possible by using different azimuth gap angles in heads 1A and 1B, thereby eliminating the requirement for the so-called guard bands between adjacent tracks. This technique of using different azimuth gap angles relies upon the well-known azimuth loss effect to prevent cross-talk between adjacent tracks. Furthermore, rotary head 1A and 1B are displaced relative to each other in the rotary axial direction, so that the scanning locus by rotary head 1A is traced by rotary head 1B in exactly the same way. Note that in the embodiment of FIG. 1, there is no free period when the two rotary heads are both out of contact with the magnetic tape 2.

Figure 3:
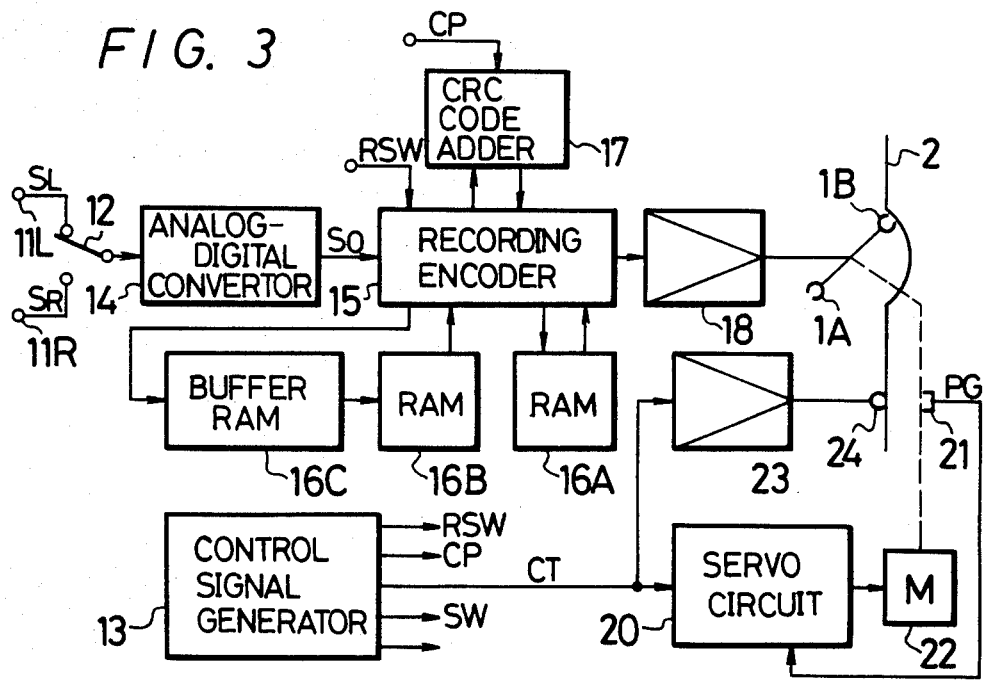
FIG. 3 is a block diagram illustrating a preferred embodiment of an apparatus for recording an analog signal according to the present invention.

FIG. 3 shows an example of the recording system in which an analog audio signal is recorded as a two channel signal, comprising left and right audio channels. A left-channel analog audio signal $S_L$ is applied through input terminal 11L to one input terminal of a switching circuit 12, and a right-channel analog audio signal $S_R$ is applied through input terminal 11R to the other input terminal of switching circuit 12. Switching circuit 12 is changed over alternately in position in response to a switching signal SW, which is a square-wave signal having a duty factor of 50%. The switching signal SW is derived from control signal generator circuit 13 at a frequency of 44.1 kHz and controls the switching circuit 12 so that the switching circuit 12 changes over at each period during which the signal SW is at a high level or at a low level. Accordingly, switching circuit 12 alternately delivers the left channel signal $S_L$ and the right channel signal $S_R$ to an analog-to-digital (A/D) converter 14. In analog-to-digital converter 14 this signal is sampled at a sampling frequency of 44.1 kHz per channel and then this sampled signal is converted to a pulse-code-modulation (PCM) signal that in this embodiment may comprise sixteen bits per sample, for example.

The output signal $S_0$ from the A/D converter 14 is fed to a recording encoder 15, and output signal $S_0$ is shown in the timing charts at FIG. 5A. Recording encoder 15 is connected to suitable memory circuits. Specifically, random access memory (RAM) 16A is directly connected to an output of recording encoder 15 and buffer random access memory 16C is connected between an output of recording encoder 15 and a second random access memory 16B. Buffer RAM 16C operates to delay the data input to RAM 16B to provide the desired time delay. Also connected to an input/output interface of recording encoder 15 is a cyclic redundancy check (CRC) code adding circuit 17. A control signal RSW, the timing waveform of which is shown in FIG. 5E, is produced by control signal generator 13 and fed to recording encoder 15, which operates in response thereto to switch the PCM signal $S_0$ every 1/60 of a second, which corresponds to the duration of time required for one revolution of heads 1A and 1B. Note again that heads 1A and 1B are rotated at a speed that is twice the reference rotation speed of 1/30 of a second. The data signal $S_0$, which is switched in recording encoder 15 in response to control signal RSW, is then written into data RAMs 16A and 16B as PCM signals $S_1, S_2, S_3, \ldots$, that have periods of 1/60 of a second and the appropriate parity words and error correcting codes are added thereto, as will be described hereinbelow.

The PCM signals $S_1, S_2, S_3, \ldots$, which have periods of 1/60 of a second, are separated in recording encoder 15 so that alternate ones of these signals $S_2, S_4, S_6 \ldots$, are written directly into RAM 16A. The timing of this is shown at FIG. 5D. Similarly, the remaining ones of the PCM signals, that is $S_1, S_3, S_5 \ldots$, are fed into buffer RAM 16 where they are delayed in time by an amount corresponding to one-half a revolution period of heads 1A and 1B, that is, 1/120 of a second, and thereby become signals $S_1', S_3', S_5', \ldots$, and are then written into RAM 16B. The timing of the signals into buffer RAM 16C and RAM 16B are shown in FIGS. 5B and 5C, respectively.

As shown in FIGS. 5C and 5D, the PCM data having a period of 1/60 of a second is written into RAMS 16B and 16A, respectively, and during the 1/20 of a second that corresponds to the one-half revolution of heads 1A and 1B following the write periods of RAMS 16A and 16B, respectively, parity word and CRC code generating and adding circuit 17 is operated to generate the error correcting parity word and CRC code, which are then added to the data in the recording encoder 15. Control signal generating circuit 13 generates the appropriate control signal CP that actuates error correcting parity word and CRC code generating and adding circuit 17. Once the PCM signals have had the parity and CRC code added thereto they are written back into RAMS 16A and 16B, respectively, and during the period of 1/120 of a second following the parity word and CRC code generating and adding period, the PCM data in each period of 1/60 of a second are read out from RAMs 16A and 16B, respectively, at a speed substantially twice that at which they were written in. In other words, the PCM data has been compressed in time-base by one-half and is then made equal to the tape contact period of either head 1A or head 1B.

As is made clear in FIG. 5, the period during which the PCM data having the compressed time-base is read out from RAMs 16A and 16B is the period TR during which the signal RSW has a high level, the waveform of signal RSW is shown in FIG. 5E. Since signal RSW is inverted in state every 1/60 of a second, which corresponds to one revolution of heads 1A and 1B, the reading out of the data is accomplished at each period representing one revolution. During the first half-period TB of period TR, or 1/120 of a second corresponding to one-half revolution of heads 1A and 1B, the PCM data having the compressed time-base is read out from RAM 16B, whereas during the second half-period TA of period TR, or 1/120 of a second, the PCM data have the compressed time-base is read out from RAM 16A. As described hereinabove, the data of each unit period having the compressed time-base read from RAMs 16A and 16B and obtained from recording encoder 15 is then supplied through a recording amplifier 18 to a respective one of the two rotary heads 1A and 1B. The control signal generating circuit 13 produces a reference signal CT, the waveform of which is shown in FIG. 5F, having a frequency of 30 Hz that is fed to a servo circuit 20 so that heads 1A and 1B are in synchronism with the signals to be recorded. During period TA head 1A scans tape 2, while during period TB head 1B scans tape 2. Thus, signal CT that has a phase different from that of signal RSW by $\pi/2$ is fed to servo circuit 20. The feedback to servo circuit 20 is provided by pulse generator 21 that generates a pulsed signal PG of frequency of 30 hertz so that a pulse is generated for each rotation of the heads 1A and 1B. The output from servo circuit 20 is fed to head drum drive motor 22 which applies the phase servo to heads 1A and 1B, so that head 1A commences contact with tape 2 at a time corresponding to the occurrence of the trailing edge of the square-wave signal CT.

If the period of time from which head 1A first commences contact with tape 2 to the time when head 1A again commences contact with tape 2 is taken as a unit rotational interval P, a first rotation period HA in this unit rotational interval P is the period during which head 1A scans tape 2, whereas the second-half rotation period HB in unit rotational interval P is the period in which head 1B scans tape 2. Thus, as shown in FIG. 5, the Read period TB from RAM 16B corresponds to every other contact period HB of head 1B with tape 2, while Read period TA from RAM 16A corresponds to every other contact period HA of head 1A with tape 2. Moreover, the second half-period HB in unit rotational interval P and the first half-period HA in the succeeding unit rotational interval P are coincident with theses very same Read periods TB and TA, respectively.

Therefore, there is recorded on tape 2 PCM time-base compressed data having a period of 1/60 of a second by head 1B in a certain unit rotational interval P thereby forming track 4B, whereas there is also recorded on tape 2 PCM time-base compressed data having a period of 1/60 of a second by head 1A during the first half period HA in the succeeding unit rotational interval P thereby forming track 4A. Although during the second half period HB in the unit rotational interval P head 1B scans track 4A no recorded signal exists during this period and, thus, the signal recorded by head 1A remains in track 4A. Similarly, although in the first half period HA and the succeeding unit rotational interval P head 1A scans Tape 2 such that a track adjoining track 4A will be formed, during this period HA no signal exists and accordingly no record track is formed. Thereafter, when the second half-period HB thereof occurs, PCM data is read out from RAM 16B and delivered to head 1B so that track 4B is formed by head 1B on which the time-base compressed PCM data is recorded. The above operations are repeated successively and tracks 4B and 4A alternately successively formed, as represented in FIG. 2, in order to record the PCM data.

The time control signal CT produced by control signal generator 13 is also fed through recording amplifier 23 to a stationary magnetic head 24, and the time control signal is thereby recorded along an edge of tape 2 as a control pulse track 6C utilized in the playback mode. Control pulse track 6C is shown on the tape 2 in FIG. 2.

Figure 4:
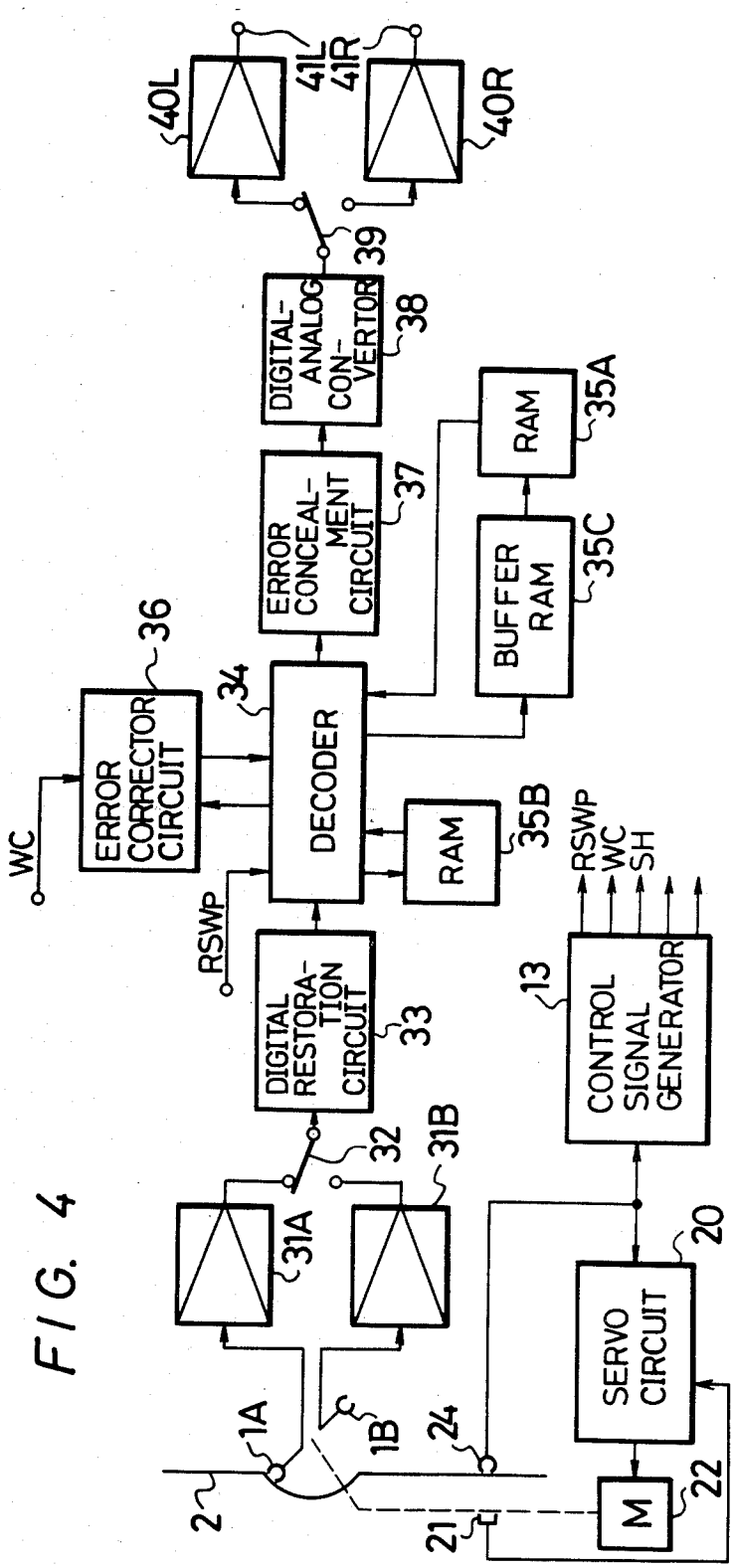
FIG. 4 is a block diagram illustrating a preferred embodiment of apparatus for reproducing an analog signal, as might be recorded by the apparatus of FIG. 3 according to the present invention.

Following a recording operation such as described above the audio PCM signal can be reproduced in the following fashion utilizing apparatus as shown in FIG. 4. In the reproducing system shown in FIG. 4, a pulsed signal having a frequency of 30 Hz is reproduced from the control pulse track 6C on tape 2 by head 24, and this pulsed signal is fed to servo circuit 20 and also to control signal generator 13. A pulsed signal PG produced by the pulse generator 21 is also fed to servo circuit 20, so that heads 1A and 1B are servo controlled to scan tracks 4A and 4B, respectively, with the identical relationship as that employed during recording. Thus, the reproduced signals obtained by heads 1B and 1A are as represented in FIGS. 5H and 5I.

The output signals produced by heads 1A and 1B are fed through amplifiers 31A and 31B, respectively, to inputs of switching circuit 32. Switching circuit 32 is alternately changed in position to select one or the other of the input terminals in response to a switching control signal SH that has a frequency of 30 Hz, the waveform of which is shown in FIG. 5G, and which is produced by control signal generator circuit 13. Thus, switching circuit 32 alternately produces a reproduced output from heads 1A and 1B, respectively, during one rotation period at every other rotation. The output signal from switching circuit 32 is fed to digital restoring circuit 33 that operates to restore the signal to a digital signal by cleaning and shaping the reproduced waveform, and the restored digital signal is fed to decoder 34 where it is decoded to the original PCM signal $S_0$. In decoder 34 the signal processing is carried out by means of RAMs 35A and 35B, which are changed over in response to a control signal $RSW_p$, the waveform of which is shown in FIG. 5M, that is produced by control signal generator circuit 13. As seen in FIG. 5M, control signal $RSW_p$ changes over between a high-level period TWB and a low-level period TWA, and in the first half of period TWB the output data reproduced by head 1B is written into RAM 35B, while in the second half of period TWB the output data reproduced by head 1A is delayed by a time of 1/120 of a second by means of buffer RAM 35C and then subsequently written into RAM 35A during the first half of period TWA. The PCM data written into RAMs 35B and 35A are corrected in error correcting circuit 36 during the second half portions of the 1/120 of a second periods of TWB and TWA, respectively. That is, since control signal WC supplied to error corrector circuit 36 from control signal generator circuit 13 goes high during the second half of periods TWB and TWA, error corrector circuit 36 is operated for error correction during those times. The waveform of control signal WC. Accordingly, error correction is performed within the error correction ability range by use of the parity word and CRC code.

The reproduced data of one track amount that were written in RAMs 35B and 35A that has been subsequently error corrected are alternately read out at a speed that is approximately one half that used in writing during periods TWA and TWB, as shown in FIGS. 5J and 5L, respectively. That is, the PCM signal which now has its time-base expanded to equal the orginal time-base is successively produced. The PCM signal from decoder unit 34 is fed to an error concealing or error amending circuit 37, which acts to conceal any errors which could not be corrected by error corrector circuit 36. This technique is well-known and various value holding systems are known to accomplish error concealment. The output signal from error concealment circuit 37 is fed to a digital-to-analog (D/A) converter 38, wherein it is returned to an analog signal and fed to switching circuit 39. Switching circuit 39 is alternately changed over in response to switching control signal SW, which is identical to the switching control signal utilized during the recording operation, and the audio signals of the left channel and right channel are thus demodulated and respectively delivered through amplifiers 40L and 40R to output terminals 41L and 41R, respectively.

Figure 6:
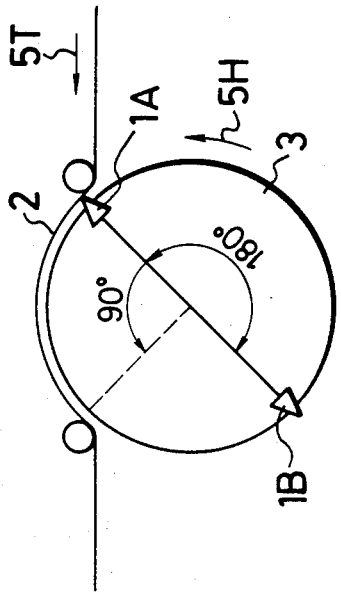
FIG. 6 is a schematic illustration of another example of a rotary head assembly used in the method and apparatus for recording and/or reproducing an analog signal according to the present invention.
Figure 7:
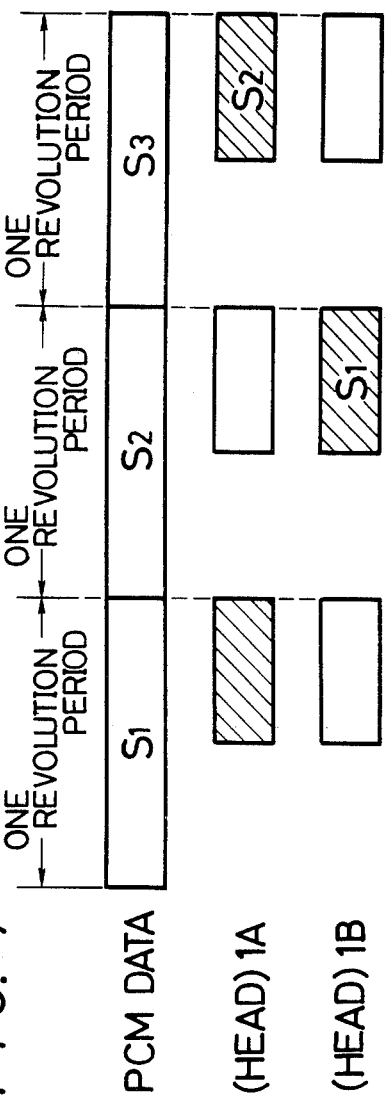
FIG. 7 is a timing chart representing the timing of a recording system according to the present invention.

Although in the above-described embodiment two rotary heads 1A and 1B are located with an angular separation of 180° therebetween and are displaced in the rotational axial direction so that the scanning locus by head 1A is scanned in exactly the same way by head 1B, is also possible to utilize the embodiment represented in FIG. 6, wherein the two rotary heads 1A and 1B are not displaced in the rotational axial direction but are disposed at positions having substantially the same rotational angle. Thus, rotary heads 1A and 1B are rotated at a speed which is twice as high as a reference speed, thereby recording the PCM signal as a time-base compressed signal, with the time-base compressed by a factor of one-half. The timing of the rotary head system of FIG. 6 is shown in FIG. 7, wherein the two rotary heads 1A and 1B operate to contact simultaneously tape 2 during only one-half of the revolution period corresponding to the wrap angle of tape 2 around the periphery of guide-drum 3 and, accordingly, both scan the same scanning locus. More specifically, heads 1A and 1B contact tape 2 at each half revolution of the rotary head assembly, thus, when heads 1A and 1B are rotated at a speed that is twice as high as a reference speed, the PCM data is respectively recorded by only head 1A during a certain one-revolution period and only by head 1B during the successive one-revolution period, as represented by the hatched portions in FIG. 7. The PCM signal corresponding to the one-revolution period of rotary heads 1A and 1B, that is, one-half revolution period amount of the reference speed, namely, the angular spacing amount of 180° that represents the tape wrap angle, can be recorded as each track that has added thereto the error correction parity word and the like and that is compressed in time-base to one-half.

Figure 8:
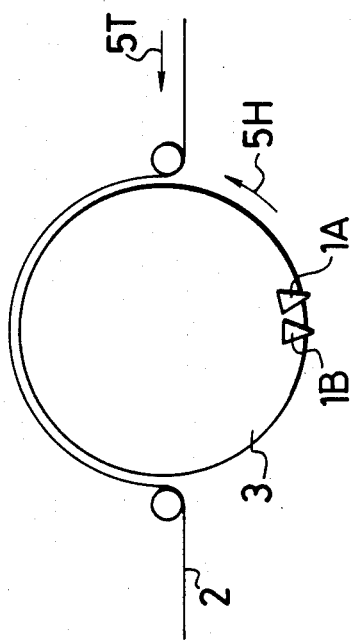
FIG. 8 is a schematic illustration of another example of a rotary head assembly used in the method and apparatus for recording and/or reproducing an analog signal according to the present invention.

In a still further embodiment, as represented in FIG. 8, the rotary heads 1A and 1B are mounted with an angular distance of 180° therebetween, however, the wrap angle of tape 2 about the periphery of guide-drum 3 is much smaller than the head separation angular distance of 180°. In FIG. 8, the tape wrap angle is one half of the head separation angular distance and is 90°, accordingly, the time-base of the recorded signal can be compressed further by an additional half, that is, compressed to one-quarter of the original time base.

Based upon the above it can be seen that the time-base compression ratio of the PCM signal is determined by the number n of rotary heads, the magnified speed ratio N of the rotary heads relative to a reference speed, and the tape wrap angle $\alpha°$ of the tape 2 about the guide-drum 3, where $\alpha°$ is less than or equal to 360°. Accordingly, the time-base compression ratio D can be determined by the following expression:

$$D = (n \times \alpha°)/(N \times 360°) \quad (1)$$

Where $N \times 360°$ is greater than $n \times \alpha°$. In utilizing this equation in the embodiment of FIG. 6, the angular distance between heads 1A and 1B is taken to be 360°.

Moreover, while the above description of the invention is based upon a case utilizing two rotary heads, the present invention also applies to systems in which there is only one rotary head and to systems in which there are more than two rotary heads. Accordingly, all that is required in equation (1) is that n, the number of heads, be a positive integer. Moreover, the rotational speed that is magnified by the ratio N of the rotary head is not limited to two times the reference spped but can be selected to be any integral multiple thereof, such as three or four times. It is also possible, in accordance with the teaching of the present invention, to select a multiple of the reference speed which is not an integral and such multiples could comprise 1.5 times, 1.8 times or the like. Nevertheless, in such case if the magnified ratio N is selected to be an integral multiple then the recording timing control for the rotary head, as well as the time-base compression processing of the PCM signal, is made substantially easier to implement.

Accordingly, as described above, and according to the present invention, since the rotational speed of the rotary head is selected to be N times a reference speed, where N is greater than 1, and the tape wrap angle $\alpha°$, where $\alpha°$ is less than or equal to 360°, is determined relative to the number of heads and the head mounting angular distance, the PCM data can be compressed in time-base with a predetermined compression ration and ultimately recorded on the tape. Moreover, since a period in which no PCM signal is recorded by any one of the rotary heads is provided by the above time-base compression, that period can be effectively utilized to accomplish the desired error correction and the like. Furthermore, time-base compression can be carried out utilizing only a minimal number of memory units.

Since the PCM signal is compressed in time-base and then recorded, the bit rate of the recorded PCM signal can be increased. In the case of the rotary head assembly, supplying and deriving the signal to and from the rotary head is achieved through a rotary transformer and, thus, the increase of the transmission band allows supplying and deriving the signal to and from the rotary head in an easier fashion. Another advantageous effect is provided in that the transmission band can be made higher than the band of the time-base error in which wow and flutter would typically occur and, thus, the adverse effects of wow and flutter are suppressed.

Furthermore, according to the present invention, since the rotational speed of the rotary head is selected to be higher than the reference speed, it is possible to raise the relative speed of the head in relation to the transport of the tape and, thus, recording head output bandwidth can be improved. Also, when the PCM signal is recorded and/or reproduced from the magnetic tape with predetermined compression ratio, the number n of rotary heads, the rotational speed N of the rotary head, and the tape wrap angle $\alpha°$ can be selected. This means that when the tape wrap angle $\alpha°$ can be increased, the diameter of the guide drum 3 can be made smaller and, hence, the capability to reduce the overall size of the recording apparatus is provided.

Additionally, as set forth hereinabove, since there occurs a period during which no signal is recorded on the tape by either of the two heads, the tape can be transported only during such period and recording by the rotary head can be carried out during the period when the tape is stopped. Therefore, even though the tape speed is changed depending on the use, the record track is formed in the mode wherein the tape is stopped so that record tracks are formed with the same angle of inclination with respect to the longitudinal axis of the tape. This means that variable speed playback effects such as fast forward and slow motion, for example, can be facilitated with relative ease.

Although illustrative embodiments of the present invention have been described in detail above with reference to the accompanying drawing, it is to be understood that the invention is not limited to those precise embodiments, and that various changes and modifications can be effected therein by one skilled in the art without departing from the spirit and scope of the invention, as defined by the appended claims.

What is claimed is:

1. Apparatus for recording an analog signal on a magnetic medium using n rotating recording heads that periodically scan the magnetic medium in a plurality of discrete traces, n being a positive integer; said apparatus comprising:
    converting means for converting said analog signal to a digital signal;
    means for rotating said n rotating recording heads at a rotary speed equal to N times a reference rotation speed, where N is greater than one;
    guide means for guiding said magnetic medium past said rotating recording heads over an angular range of $\alpha°$, where $\alpha°$ is less than 360°;
    compressing means for time-base compressing said digital signal by a ratio of $(n \times \alpha°)/(N \times 360°)$ at predetermined periods and producing a time-base compressed recording signal; and
    means for selectively supplying said time-base compressed recording signal to said n rotating heads for recording on said magnetic medium.

2. Apparatus for recording an analog signal according to claim 1, in which said n rotating recording heads comprise two equally spaced magnetic heads and said magnetic medium comprises a magnetic tape;
    said guide means includes means for guiding said tape past said two equally spaced magnetic heads over an angular range of 180°; and
    said means for rotating said n rotating recording heads includes means for rotating said two equally spaced rotating heads at a speed that is two times said reference rotation speed.

3. Apparatus for recording an analog signal according to claim 2, including means for mounting said two equally spaced magnetic heads to be mutually displaced in the rotational axial direction such that a scanning locus of one head is coincident with a scanning locus of the other head during guiding of said magnetic tape past said rotating recording heads.

4. Apparatus for recording an analog signal according to claim 3, in which said means for selectively supplying said time-base compressed signal to said rotating heads includes means for supplying said signal to said two equally spaced magnetic heads during periods when said heads contact said tape once every two revolutions of said rotating recording heads.

5. Apparatus for recording an analog signal according to claim 1 in which said n rotating recording heads comprise two magnetic heads arranged substantially at the same position; said magnetic medium comprises a magnetic tape; and guide means includes means for guiding said magnetic tape past said two magnetic heads arranged at substantially the same position over an angular range of 90°; and said means for rotating said heads includes means for rotating said two magnetic heads at two times said reference rotation speed.

6. Apparatus for recording an analog signal according to claim 1, in which said converting means includes means for providing a pulse-code-modulated (PCM) signal representing said analog signal; and further comprising digital data generating means for supplying parity data and a cyclic redundancy check code to be combined with said PCM signal to form a composite signal.

7. Apparatus for recording an analog signal according to claim 6, in which said compressing means includes a memory means for storing and time-base compressing said digital signal; and said digital data generating means adds said parity data and said cyclic redundancy check code to said PCM data and writes the resultant composite signal into said memory means.

8. A method for recording an analog signal on a magnetic medium using n rotating recording heads that periodically scan the magnetic medium in a plurality of discrete traces, n being a positive integer; the method comprising the steps of:
    converting said analog signal to a digital signal;
    rotating said n recording heads at a rotary speed equal to N times a reference rotation speed, where N is greater than one;
    guiding said magnetic medium past said rotating recording heads over an angular range of $\alpha°$, where $\alpha°$ is less than 360°;
    time-base compressing said digital signal by a ratio of $(n \times \alpha°)/(N \times 360°)$ and producing a time-base compressed recording signal; and
    selectively supplying said time-base compressed recording signal to said n rotating recording heads for recording on said magnetic medium.

9. A method for recording an analog signal according to claim 8, further comprising the steps of arranging said rotating recording heads as two equally spaced magnetic heads and providing said magnetic medium as a magnetic tape;

guiding said magnetic tape past said two equally spaced magnetic heads over an angular range of 180°; and rotating said two magnetic heads at a speed equalling two times said reference rotation speed.

10. A method for recording an analog signal according to claim 9, including the further steps of mounting said two equally spaced rotating magnetic heads to be mutually displaced in the rotational axial direction such that a scanning locus of one head is coincident with a scanning locus of the othr head during guiding said magnetic tape past said rotating recording heads.

11. A method for recording an analog signal according to claim 10, in which said step of selectively supplying said time-base compressed recording signal to said heads includes the step of supplying said recording signal to said magnetic heads during periods when said magnetic heads contact said tape once every two revolutions of said magnetic heads.

12. A method for recording an analog signal according to claim 9, including the steps of arranging said two magnetic heads to be substantially at the same position and providing said magnetic medium as a magnetic tape;

guiding said magnetic tape past said two magnetic heads arranged at substantially the same position over an angular range of 180°; and rotating said magnetic heads at a speed two times said reference speed.

13. A method for recording an analog signal according to claim 8, in which the step of converting said analog signal to a digital signal includes the steps of providing a pulse-code-modulated (PCM) signal representing said analog signal and generating parity data and a cyclic redundancy check (CRC) code; and combining said parity data and said CRC code with said PCM signal to form a composite signal therefrom.

14. A method for recording an analog signal according to claim 13, in which the step of time-base compressing said digital signal includes the steps of providing a memory for storing and compressing said digital signal, adding said parity data and said cyclic redundancy check code to said PCM data, and writing the resultant composite signal into said memory.

15. Apparatus for reproducing an analog signal which has been recorded as a corresponding digital signal in time-base compressed form in a composite digital signal including parity and error correction data in corresponding tracks on a record medium, comprising:

n rotating reproducing heads for scanning said magnetic medium and reproducing said composite digital signal in successive reproducing periods, n being a positive integer;

means for rotating said n reproducing heads at a rotary speed N times a reference rotation speed, where N is greater than one;

reproducing guide means for guiding said record medium past said heads over an angular range of $\alpha°$, where $\alpha°$ is less than 360°;

error correction means for correcting errors contained in said reproduced composite digital signal reproduced by said reproducing heads;

memory means for time-base expanding said corrected digital signal with an expansion ratio of $(N \times 360°)/(n \times \alpha°)$; and converting means for converting the time-base expanded digital signal into a corresponding analog signal.

16. Apparatus for reproducing an analog signal according to claim 15, in which said digital signal as recorded is a PCM signal and said memory means includes a pair of random-access memories for receiving reproduced PCM signals during said reproducing periods.

17. Apparatus for reproducing an analog signal according to claim 16, further comprising error concealment circuit means for concealing non-corrected errors in said error-corrected PCM signal.

* * * * *